United States Patent Office 2,790,715
Patented Apr. 30, 1957

2,790,715

PROCESS FOR THE PRODUCTION OF PHOTOGRAPHIC IMAGES IN NATURAL COLOURS BY THE SUBTRACTIVE THREE-COLOUR PROCESS

Simeon Papadakis, Paris, France

No Drawing. Application November 6, 1953,
Serial No. 390,731

2 Claims. (Cl. 96—13)

This invention relates to a process for the production of photographic images in natural colours by the subtractive three-colour method.

It is known at the present time that it is possible to produce in the thickness of a suitable support comprising a cellulose ester an image in diazo compound colours if, during the manufacture of the support, a diazo compound mixed with a solvent and containing a coupling agent is incorporated in the cellulose solution. After exposure of the diazotised and dry support thus obtained behind a positive master plate, it is only necessary to immerse the said support in an ammoniacal or sodium base in order to fix the coloured image thus produced and to provide a coloured positive identical with the master plate.

However, in order to produce an image in three colours it is then necessary first to cast on one of the surfaces of the support thus already coloured, a fresh cellulose solution containing a diazo compound and a coupling agent of another primary colour, then to make another exposure behind a positive corresponding to the desired selection, and finally to repeat these operations a third time using a coupling agent and a positive corresponding to the third primary colour.

This method is very delicate and involves disadvantages due, inter alia, to the loss of time arising from the successive casting of the cellulose layers and the preliminary manufacture of the positive plates.

The object of the present invention is to obtain transparent positives with colours on a support made from a cellulose ester such as is commercially obtainable, e. g. cellulose nitrate, acetate, or butyrate by using the property which these substances have of being more or less soluble in some volatile solvents.

With the foregoing object in view the process according to the present invention for producing a coloured image by the three-colour process on a support comprising a cellulose ester film consists in first treating the support in a basic solution consisting of a diazosulphonate and a coupling agent for the blue colour component dissolved in a volatile solvent, exposing the support thus treated behind the negative of the blue colour component, subsequently washing the support in an alcoholic caustic soda solution to dissolve the diazosulphonate and coupling agent which is untransformed by light, and thereafter washing the support to eliminate the alcoholic caustic soda, and repeating these operations for the red and yellow components, which may be applied in either order, a suitable diazosulphonate and coupling agent being used for each of the three colours.

The process according to the invention is simpler than the known process above referred to and provides for introducing into the thickness of a suitable cellulose film such as can be readily obtained in commerce, a number of successive coloured prints, thus providing a photographic reproduction of a subject in its natural colours. The invention makes use in particular of:

1. Commercial cellulose products, such for example as the known celluloid, and
2. The sulphinic diazo compounds known as diazosulphonates.

Another feature of the invention is that it provides for introducing into a single support a number of coloured impressions without having recourse to new applications of cellulose ester, and, further, for using directly the selection negatives for the printing, thus eliminating the necessity for previously making positive plates corresponding to the selected negatives.

In carrying the invention into effect, it is only necessary to immerse quickly a cellulose support in a solution consisting of a diazosulphonate to which is added a volatile solvent and a coupling agent, for the blue component, in an alkaline medium.

By reason of the volatile solvent the support dries very rapidly and it is then exposed behind that one of the three colour negatives which corresponds to the blue colour, until such time as the image acquires the desired intensity. The support is then passed into an alcoholic caustic solution to dissolve the diazosulphonate and its coupling agent which is untransformed by light, and to acquire at the same time its final blue-green colouration; it is then washed in order to eliminate the alcoholic caustic soda.

These operations are then twice repeated on the same support for the red and yellow colours using a mixture comprising a diazosulphonate, solvent, and coupling agent corresponding to each of these two colours, exposure taking place behind the two negatives corresponding respectively to these two colours.

The foregoing is a general description of the method employed according to the invention but there are practical difficulties which may be harmful to the final result. For example, the cellulose layer may lose its polish or one of the colours may be changed in the course of the successive sensitising operations, if necessary precautions are not taken, and if the process is not carried out in a proper manner. This applies also to the case where diazo compounds are used without proper selection and not in the proper order, because all these compounds do not give the desired result. Only a small number can be used as a diazo base capable of giving good results in a given order.

The following precautions are necessary:

(1) A given order of printing must be compiled with, in particular for the blue colouring;

(2) A well defined class of diazosulphonate base and coupling agent must be used;

(3) The quantities of the solutions and the sensitizing times must be accurate.

One method in accordance with the invention for producing a three-colour image on a film of cellulose ester will now be described, but it is to be understood that this method and the accompanying formulae are given only by way of example, and that other products and materials of the same family are within the scope of the present invention, insofar as they are applicable to the process hereafter described.

It is a necessary condition for carrying out the invention that the first image to be formed should be the blue component, because of the composition of the diazosulphonate employed in its production which provides the possibility of printing on this blue image (which is completely fixed and neutral after eliminating the untransformed products) the two other images, i. e. the red and yellow components, by using a diazosulphonate of a different composition. If this order is not adhered to a reaction will inevitably be produced between the different residual products of the diazo compounds the result of which would be either to destroy or to change the colour of the preceding image or images. However, the order in which the red and yellow colours are applied can be reversed since these make use of the same diazo base.

In the particular method now to be described a cellulose support comprising cellulose acetate or nitrate, or triacetate, for example, a celluloid support, i. e. a photographic or cinematographic film, transparent or not, without emulsion or substratum, is impregnated by means of a roller or in any other way, e. g. by direct dipping, in a bath of a solution composed of a diazosulphonate to which is added a solvent and a coupling agent for blue, for example as follows:

Solution A

| | | |
|---|---|---|
| The diazosulphonate of the 5 - amino - 2-benzoyl-amino-1-4-diethoxybenzol | grs | 2.5 |
| Distilled water | cc | 15 |
| Acetone | cc | 15 |
| Methyl alcohol | cc | 60 |

Solution B

| | | |
|---|---|---|
| The ortho-toluidine of 2–3 oxynaphthoic acid | gr | 1 |
| Methyl alcohol | cc | 50 |
| Amyl acetate | cc | 50 |
| NaOH (30% by weight) | cc | 2 |

Sensitizing solution for blue

| | Cc. |
|---|---|
| Solution A | 50 |
| Solution B | 50 |
| NaOH (30% by weight) | 7 |

The treatment in the last solution by dipping or immersion should not exceed fifteen seconds. Drying is completed in about thirty seconds. The support is carefully dried and placed in contact with the negative taken behind the orange screen and is exposed preferably in light from a mercury vapour lamp, until such time as the intensity of the blue-violet image is satisfactory (about two minutes). After this exposure the film is dipped in a solution, for example, as follows:

| | Cc. |
|---|---|
| Ordinary water | 100 |
| Methyl alcohol | 25 |
| NaOH (30% by weight) | 5 |

This solution at first causes the film to lose its uniform yellow colour due to the diazo compound and gives to the primitive blue-violet colouration its final primary blue-green colour. It is then washed in running water until all traces of alcohol and NaOH are eliminated and carefully dried.

The support is then impregnated in the way above described in a solution having a base of diazosulphonate-coupling agent for red-solvent, for example:

Solution A

| | | |
|---|---|---|
| Diazosulphonate of 1-amino-2-4-dimethylbenzol | grs | 7 |
| Distilled water | cc | 10 |
| Methyl alcohol | cc | 90 |

Solution B

| | | |
|---|---|---|
| The ortho-toluidine of 2–3 oxynaphthoic acid | gr | 1 |
| Methyl alcohol | cc | 50 |
| Amyl acetate | cc | 50 |
| NaOH (30% by weight) | cc | 2 |

Sensitizing solution for red

| | Cc. |
|---|---|
| Solution A | 75 |
| Solution B | 25 |
| NaOH (30% by weight) | 2.5 |

The time for sensitizing the support in this solution should in this case also not exceed fifteen seconds. After drying, the support is placed in contact with the negative taken behind the green screen in accurate register with the blue image already formed. Then exposure is made up to the desired intensity (also about two minutes) and in this way a blue and red bichrome is obtained. The support is given a preliminary washing in the alcohol-NaOH solution above described for the blue, and is then rinsed in running water until all traces of alcohol and sodium are eliminated, and finally it is carefully dried.

The third operation is similar to the first two, that is to say that the support is dipped for a third time in a diazo solution for yellow composed of a mixture of the solution A above described for red, to which is added the following solution B:

Solution B for yellow

| | | |
|---|---|---|
| Phenyl-3-methyl-pyrazolone | gr | 3 |
| Methyl alcohol | cc | 50 |
| Amyl acetate | cc | 50 |
| NaOH (30%) | cc | 2.5 |

Sensitizing solution for yellow

| | Cc. |
|---|---|
| Solution A for the red base | 75 |
| The above solution B | 25 |
| NaOH (30%) | 2.5 |

After sensitizing again for a time of fifteen seconds and drying, the support is accurately positioned with the negative taken behind the indigo screen and exposed for such time (about five minutes) as is necessary to obtain the desired intensity, whereupon it is passed into an alcohol-NaOH solution and finally washed. The image is then completely finished and reproduces faithfully the colours of the subject photographed.

An interesting feature of the invention is that it provides the possibility of obtaining an image of uniform photographic black colour.

At the present time there is no known coupling agent which can provide with a single diazosulphonate the photographic grey-black shade, the shades actually obtained varying from dark violet to brown-black. The process according to the invention makes it easy to obtain this black shade, it only being necessary to:

(1) Use, for the three exposures, a single negative, either an ordinary negative or a negative taken behind an orthochromatic filter, and (2) To carry out the three successive exposures so as to obtain at the time of coupling a precipitate of blue-red-yellow colours in such a proportion that the mixture of the three colours gives the desired photographic grey-black colour.

What I claim and desire to secure by Letters Patent is:

1. A process for producing a coloured image by the three colour process on a support comprising a cellulose ester film, consisting in first treating the support in a basic solution consisting of the diazosulphonate of 5-amino-2-benzoylamino-1-4-diethoxybenzol and a coupling agent for the blue colour component dissolved in a volatile solvent, exposing the support thus treated behind the negative of the blue colour component, subsequently washing the support in an alcoholic caustic soda solution to dissolve the diazosulphonate and coupling agent which is untransformed by light, and thereafter washing the support to eliminate the alcoholic caustic soda, and repeating these operations for the red and yellow colour components in desired order utilizing for the basic solution in treating for the red and the yellow color components respectively, the diazosulphonate of 1-amino-2-4-dimethylbenzol and a coupling agent suitable to the particular color component then being treated for, said coupling agent being dissolved in a volatile solvent, exposing the support thus treated behind the negative pertaining to said particular colour component, subsequently washing the support in an alcoholic caustic soda solution to dissolve the portions of said solutions not hardened by light, followed by washing the support to eliminate the alcoholic caustic soda, and in treating the support for the other one of said red and yellow colour components utilizing for the basic solution the diazosulphonate of 1-amino-2-4-dimethylbenzol and a coupling agent for said other color component dissolved in a volatile solvent, exposing the support thus treated behind the negative pertaining to said other colour component, subsequently washing the support in an alcoholic caustic soda solution followed by washing the support to eliminate the alcoholic caustic soda as before, thereby producing a coloured image of the subject photographed.

2. Process according to claim 1 consisting in using one and the same orthchromatic negative plate for the three successive exposures in order to produce after the successive exposures and colourings a mixed shade giving the photographic grey-black colour instead of the various colours.

References Cited in the file of this patent

UNITED STATES PATENTS

| 2,200,018 | Bertrand | May 7, 1940 |
| 2,496,196 | Botkin | Jan. 31, 1950 |
| 2,591,309 | Slifkin et al. | Apr. 1, 1952 |
| 2,593,928 | Slifkin | Apr. 22, 1952 |

FOREIGN PATENTS

| 299,010 | Great Britain | Jan. 15, 1930 |
| 536,714 | Great Britain | May 23, 1941 |
| 627,254 | Great Britain | Aug. 4, 1949 |